US008606254B2

(12) United States Patent
Earnshaw

(10) Patent No.: US 8,606,254 B2
(45) Date of Patent: Dec. 10, 2013

(54) METHOD AND SYSTEM FOR RECEIVER ADAPTATION BASED ON KNOWLEDGE OF WIRELESS PROPAGATION ENVIRONMENTS

(75) Inventor: Mark Earnshaw, Kanata (CA)

(73) Assignee: BlackBerry Limited, Waterloo, CA (US)

( * ) Notice: Subject to any disclaimer, the term of this patent is extended or adjusted under 35 U.S.C. 154(b) by 891 days.

(21) Appl. No.: 12/609,584

(22) Filed: Oct. 30, 2009

(65) Prior Publication Data

US 2011/0105101 A1    May 5, 2011

(51) Int. Cl.
*H04M 3/00* (2006.01)
*H04M 11/00* (2006.01)

(52) U.S. Cl.
USPC ............. 455/418; 455/403; 370/519

(58) Field of Classification Search
USPC ............ 455/403, 67.16, 418–420; 370/519
See application file for complete search history.

(56) References Cited

U.S. PATENT DOCUMENTS

| | | | |
|---|---|---|---|
| 5,442,805 A | | 8/1995 | Sagers et al. |
| 6,389,295 B1 * | | 5/2002 | Ramesh ............... 455/517 |
| 7,020,461 B2 | | 3/2006 | Okanoue et al. |
| 7,333,774 B2 | | 2/2008 | Banerjee et al. |
| 2002/0002046 A1 * | | 1/2002 | Okanoue et al. ............ 455/423 |
| 2006/0233269 A1 * | | 10/2006 | Bhushan et al. ............ 375/260 |
| 2008/0167047 A1 * | | 7/2008 | Abedi ............... 455/442 |
| 2008/0219374 A1 * | | 9/2008 | Fernandez-Corbaton et al. ............ 375/267 |
| 2008/0304601 A1 * | | 12/2008 | Abraham et al. ............ 375/340 |

FOREIGN PATENT DOCUMENTS

| | | |
|---|---|---|
| WO | 0011798 | 3/2000 |
| WO | 2006113419 | 10/2006 |
| WO | 2008097021 A1 | 8/2008 |
| WO | 2008102991 A1 | 8/2008 |

OTHER PUBLICATIONS

Michael Tyson et al, "RF Propagation Environment Awareness for Smart Mobile Ad-Hoc Networks", Nov. 18-20, 2008, MILCIS 2008, Canberra—article found at: http://www.milcis.com.au/milcis2008pdf/Reviewed%20papers/Tyson-final.pdf.
European application No. 09174630.5 European Search Report, dated Oct. 4, 2010.
European application No. 09174630.5, partial European Search Report, dated Apr. 9, 2010.
Chen N. et al: "OFDM Timing Synchronisation Under Multi-path Channels" Proceedings of the 57th IEEE Semiannual Vehicular Technology Conference, vol. 4, Apr. 22, 2003, pp. 378-382, XP010862179, Jeju, Korea ISBN: 978-0-7803-7757-8 (subsection IIB; section III; fig 5).

* cited by examiner

*Primary Examiner* — George Eng
*Assistant Examiner* — Jing Gao
(74) *Attorney, Agent, or Firm* — Moffat & Co.

(57) ABSTRACT

A method and apparatus for receiver adaptation of a mobile device communicating with a network cell, the method determining propagation environment information at a processor of the mobile device; and configuring at least one of an algorithm and control parameters of a receiver of the mobile device utilizing the propagation environment information. Further, a method and apparatus for obtaining propagation environment information at a mobile device including: acquiring a cell identifier at the mobile device; and receiving propagation environment information corresponding to the acquired cell identifier.

22 Claims, 13 Drawing Sheets

METHOD AND SYSTEM FOR RECEIVER ADAPTATION BASED ON KNOWLEDGE OF WIRELESS PROPAGATION ENVIRONMENTS

FIELD OF THE DISCLOSURE

The present disclosure relates to propagation environments for wireless cellular communications, and in particular, to receivers in various propagation environments.

BACKGROUND

Wireless cellular communication devices must function well in a variety of propagation environments. For example, in dense urban propagation environments a large number of buildings may block a direct path between a base station and a mobile terminal and cause a number of reflections for the downlink wireless signal arriving at the mobile terminal. In suburban propagation environments, the environment consists of more widely spaced smaller buildings and it is generally easier to obtain a more direct line of sight to a cellular base station, causing fewer wireless signal reflections.

As part of receiver processing, propagation paths are tracked as observed by the receiver. However, new propagation paths may appear, especially in dense urban environments, as a mobile terminal moves. It is beneficial to identify the presence and location of such a new propagation path as quickly as possible, as the new propagation path may cause interference to the downlink signal that is currently being received, until the receiver is able to adjust the appropriate control parameters. Similarly, if a propagation path disappears, it is beneficial to identify this event as quickly as possible, in case the appropriate receiver parameters require adjustment.

BRIEF DESCRIPTION OF THE DRAWINGS

The present disclosure will be better understood with reference to the drawings, in which.

DETAILED DESCRIPTION

Figure 1:
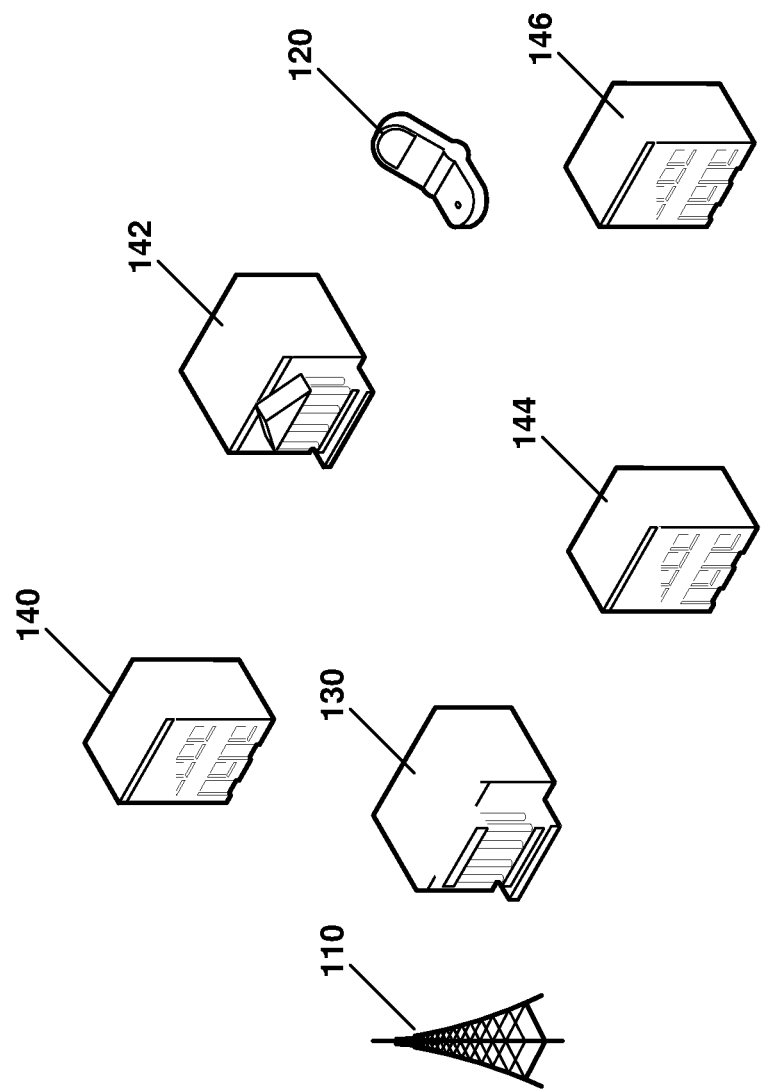
FIG. 1 is a top perspective view of an exemplary dense urban propagation environment.

The present disclosure provides a method for receiver adaptation of a mobile device communicating with a network cell, comprising: determining propagation environment information at a processor of the mobile device; and configuring at least one of an algorithm and control parameters of a receiver of the mobile device utilizing the propagation environment information.

The present disclosure still further provides a mobile device, comprising: a communications subsystem configured for communicating with a network cell, the communications subsystem including a receiver; and a processor, wherein the mobile device is configured to: determine propagation environment information at the processor; and configure at least one of an algorithm and control parameters of the receiver on the mobile device utilizing the propagation environment information.

The present disclosure further provides a method for obtaining propagation environment information at a mobile device comprising: acquiring a cell identifier at the mobile device; and receiving propagation environment information corresponding to the acquired cell identifier.

The present disclosure further provides a mobile device, comprising: a communications subsystem configured for communicating with a network cell, the communications subsystem including a receiver; and a processor, wherein the mobile device is configured to: acquire a cell identifier at the mobile device; and receive propagation environment information corresponding to the acquired cell identifier.

In an orthogonal frequency division multiplexing (OFDM) receiver, a Fast Fourier Transform operation (FFT) is performed for decoding. The FFT window, which is equal in length to the overall OFDM symbol length minus the cyclic prefix length, is positioned such that copies of the following OFDM symbol do not interfere with the current OFDM symbol, provided that the relative delay between the first and last propagation paths does not exceed the time length of the cyclic prefix. Thus, the FFT window does not normally overlap any of the received copies of the following OFDM symbol. The avoidance of intersymbol interference via appropriate positioning of the FFT window is one feature of OFDM. However, when a new propagation path appears, the new propagation path may cause intersymbol interference in the current FFT window. The intersymbol interference degrades receiver performance and, as such, the receiver should identify the new propagation path as quickly as possible and then reposition the FFT window if necessary to avoid any intersymbol interference.

Tracking propagation paths observed by the receiver involves a tradeoff between performance and computational expense. In particular, the more frequently a check is made to determine whether one or more new propagation paths have appeared, the more quickly the receiver can react to the new propagation path(s). However, frequent checking for propagation paths requires greater computational processing and thus causes battery life drain. Conversely, less frequent checking for new propagation paths will cause the receiver to react more slowly on average to new propagation paths. However, less frequent checking reduces drain on the battery.

The present disclosure utilizes knowledge of current propagation environments in order to customize operation of certain wireless receiver components. Such customization includes, but is not limited to, the selection of specific algorithms and/or control parameter sets. For example, the performance of the downlink (DL) synchronizer and Fast Fourier Transform window positioner depends on knowledge of the environment. This information aids the component to compensate for changes in the environment by adjusting the Fast Fourier Transform window to the correct position and improves system performance by adjusting the time interval between successive update searches, and choosing a tracking algorithm to be used and its control parameters that have been optimized for the current propagation environment.

In a further embodiment, methods are provided by which the mobile terminal can obtain knowledge of the current wireless propagation environment. The mobile terminal may receive unique identifiers for a current cell from the base station as part of a transmitted signal. A lookup table may be stored in the mobile terminal, which maps the cell identifier with a propagation environment parameter. The table may be refreshed and updated as needed. If valid information for the cell is already stored in the mobile terminal, the mobile terminal may use it. If the local lookup table does not have propagation environment information for the cell, the mobile terminal may obtain the information externally. Obtaining information may be done in a variety of ways, including but not limited to signaling bits specifying the environment being broadcasted by a transmitter, external databases that store unique identifiers and corresponding environment parameters, the utilization of global positioning systems (GPS) and external databases to receive the information, among others. The information can then be used to configure relevant physical layer components.

Reference is now made to FIG. 1. FIG. 1 shows an example of a dense urban propagation environment that includes a number of large buildings. For example, the downtown of any major urban center such as New York City may be considered to be a dense urban propagation environment. As seen in FIG. 1, a base station 110 communicates with a mobile terminal 120. However, due to one or more buildings such as building 130, a direct line of sight does not exist between base station 110 and mobile terminal 120. The propagation path will then involve reflections, for example, off of various buildings such as buildings 140, 142, 144 or 146 in order to reach mobile terminal 120.

Figure 2:
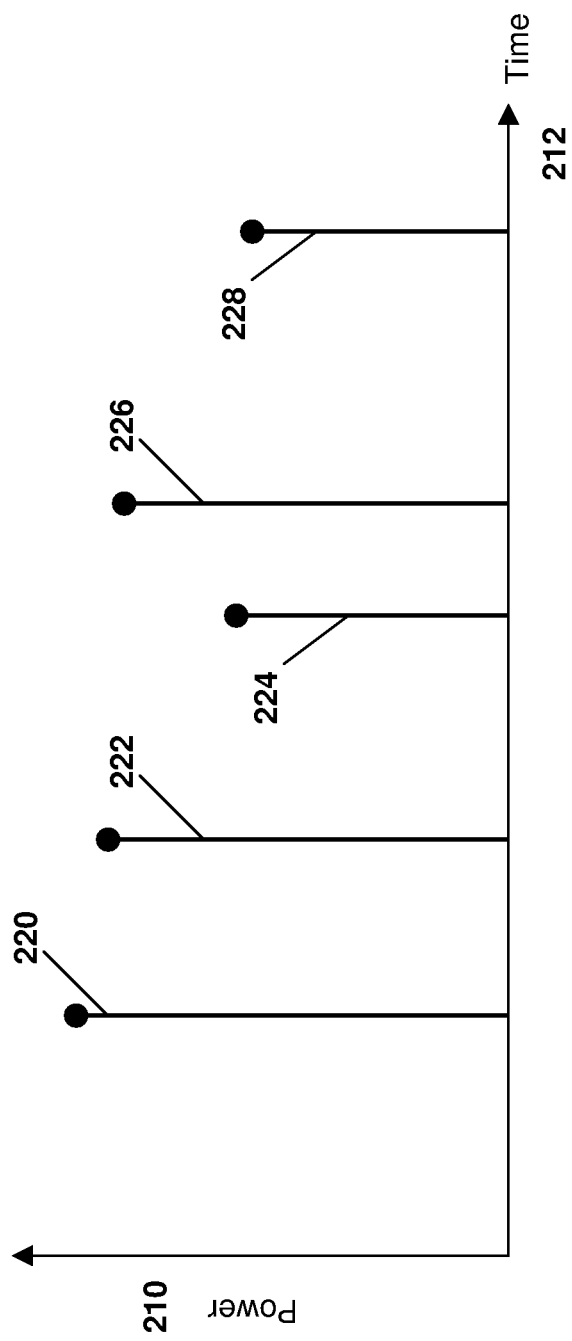
FIG. 2 is a graph showing exemplary propagation path signals received and the power associated with each of the propagation path signals.

Referring to FIG. 2, FIG. 2 shows an example of the propagation path signals that may arrive at the mobile terminal in a dense urban environment. As seen, the vertical axis 210 represents the power of the signal received and the horizontal axis 212 represents the time at which the signal is received.

In the example of FIG. 2, five propagation paths for the same symbol reach a mobile terminal, such as mobile terminal 120 of FIG. 1. These paths are identified as paths 220, 222, 224, 226 and 228.

As seen from FIG. 2, the paths have different times at which they reach mobile terminal 120 and have different powers for the signal that reaches the mobile terminal. However, in the example of FIG. 2, the relative path powers are all roughly within the same order of magnitude. This may be the result of all of the propagation paths corresponding to reflections of the original signal, with no direct line of sight path existing between the transmitter and receiver.

Figure 3:
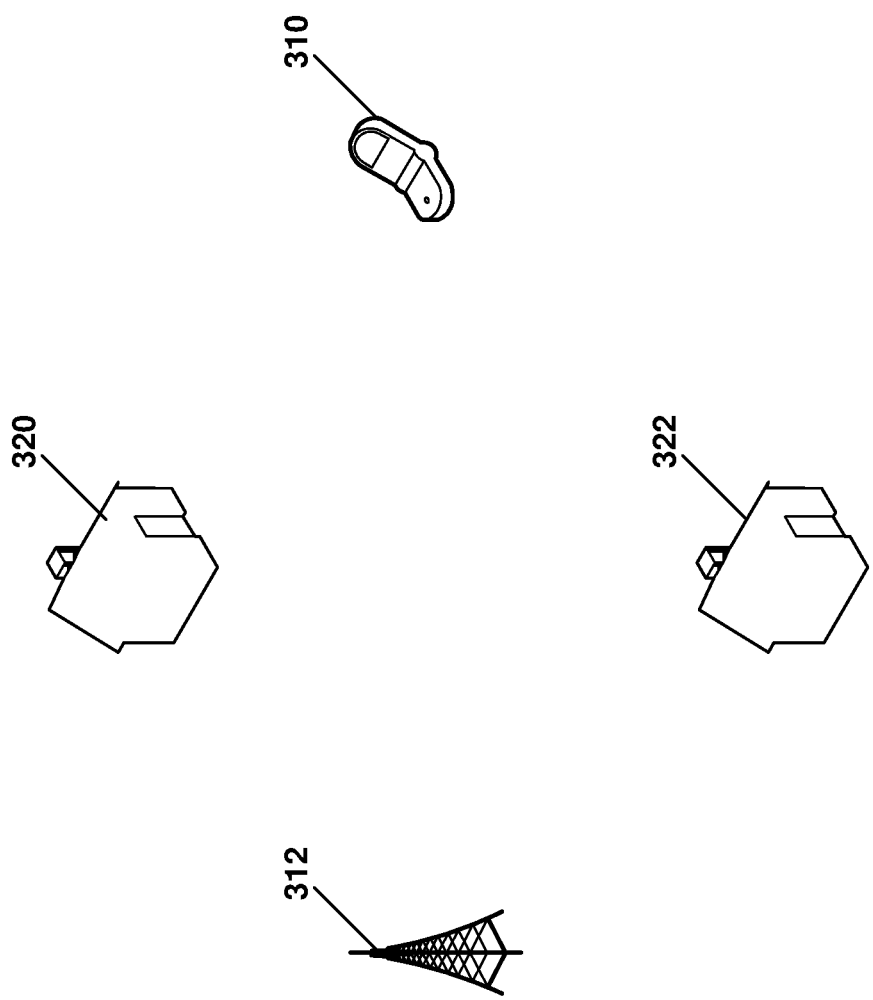
FIG. 3 is a top perspective view of an exemplary suburban propagation environment.

Referring to FIG. 3, FIG. 3 shows an example of a suburban propagation environment in which buildings are more widely spaced and smaller, including, for example, housing. In this regard, it is generally easier to obtain a more direct line of sight between a base station 312 and a mobile terminal 310. Various housing is shown as housing 320 and 322 in the example of FIG. 3.

Figure 4:
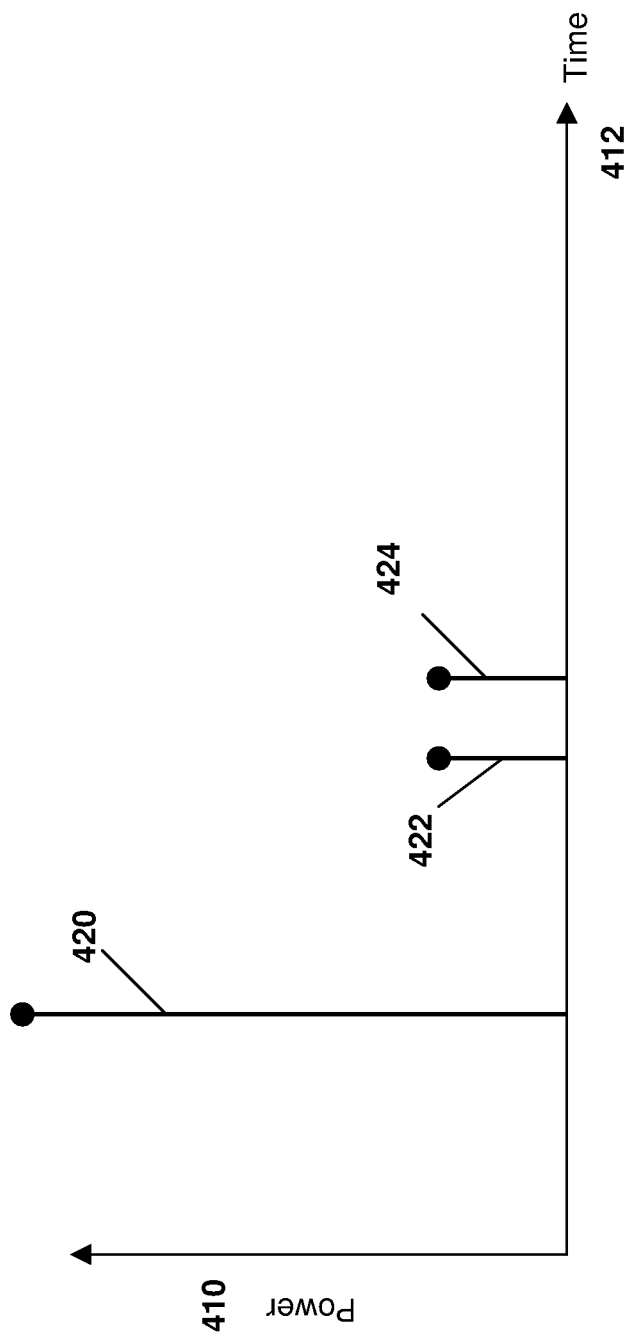
FIG. 4 is a graph showing exemplary propagation path signals received and the power associated with each of the propagation path signals.

Example propagation paths for the suburban environment of FIG. 3 are shown with regard to FIG. 4. In FIG. 4, the vertical axis 410 represents the power of the signal received and the horizontal axis 412 represents the time at which the signals are received. As seen from FIG. 4 a dominant signal 420 is received at the mobile terminal. This likely represents a direct line of sight signal at the terminal. Further, signals 422 and 424 are received subsequently. These may be reflections off of various structures such as houses 320 or 322 from the example of FIG. 3.

In FIG. 4, received signals 422 and 424 have a weaker signal strength than signal 420 and arrive after a short time delay from the direct line of sight signal represented by signal 420.

As seen from FIGS. 1-4 above, the environment therefore plays a role in the number and relative strengths of propagation paths received by a mobile terminal.

As part of receiver processing, different propagation paths as observed by the receiver are tracked. For example, reference is now made to FIG. 5, which shows an example of three existing propagation paths 510, 512 and 514, which are being tracked by a mobile terminal.

Figure 5:
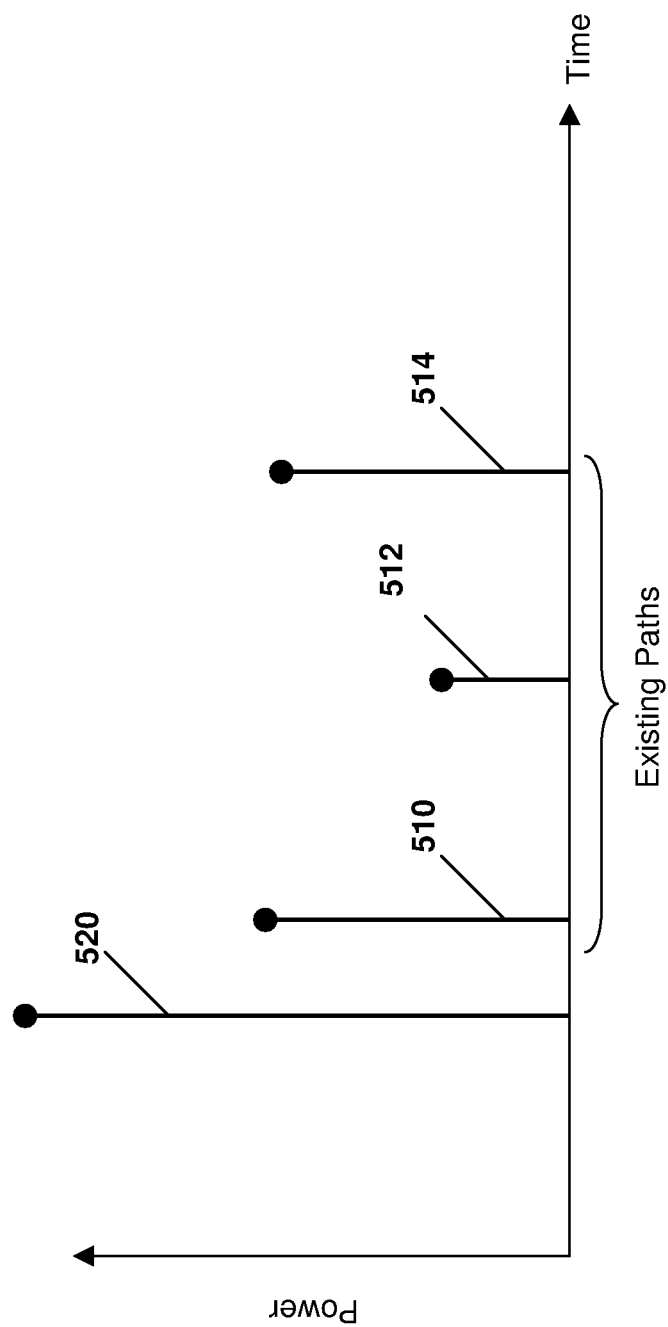
FIG. 5 is a graph showing exemplary propagation paths in which a new propagation path appears.

A new propagation path suddenly appears as depicted by propagation path 520 in FIG. 5. Such appearance of a new propagation path could be a common occurrence in dense urban environments as a mobile terminal moves around. For example, a mobile terminal could move out from behind a large building and suddenly obtain a direct line of sight from the base station transmitter. The appearance of the new propagation path may cause interference to the downlink signal that is currently being received.

Figure 6:
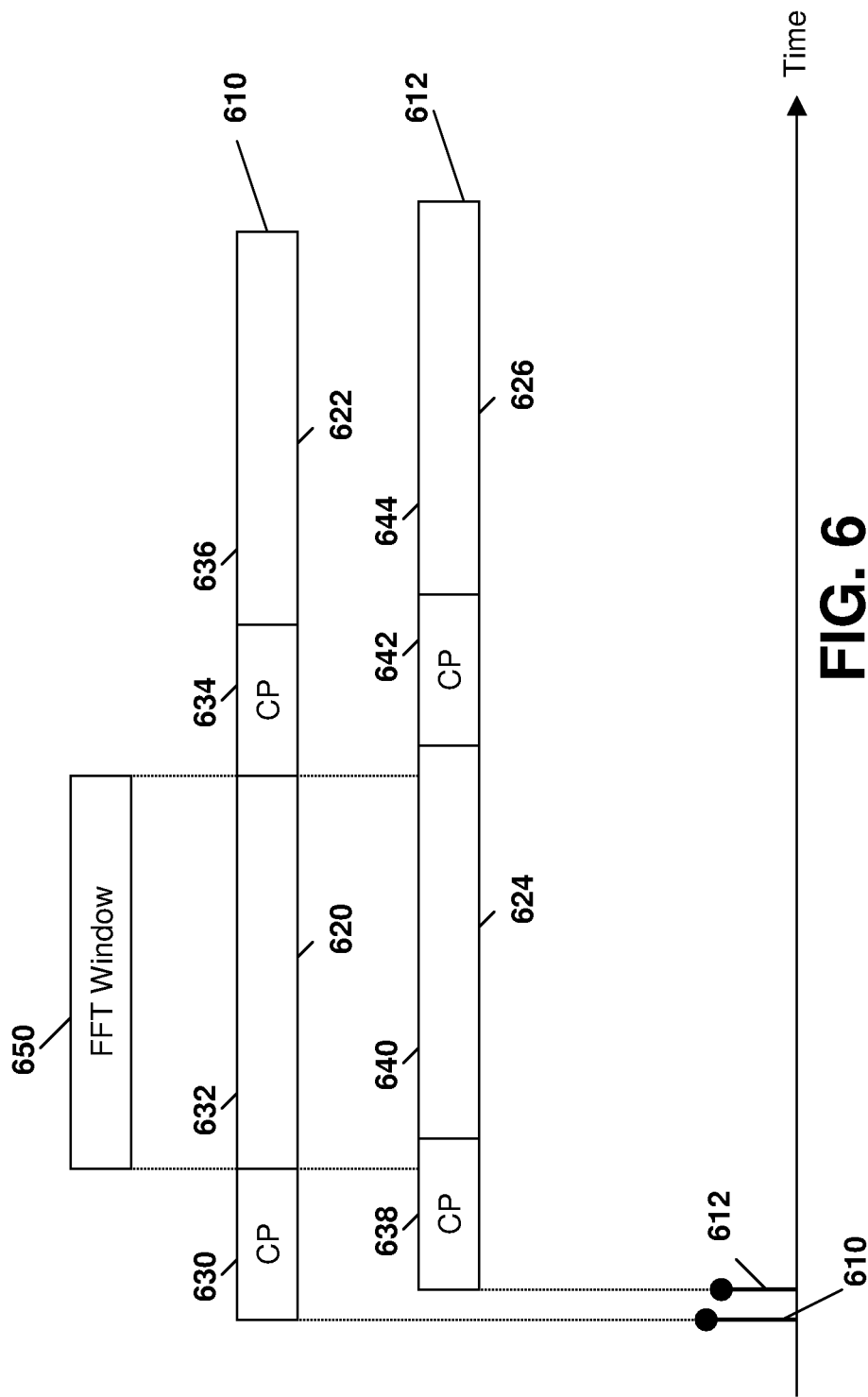
FIG. 6 is a diagram showing positioning of a Fast Fourier Transform window in a system having two propagation paths.

Reference is now made to FIG. 6. FIG. 6 shows an example of an FFT operation in an OFDM receiver. Initially, two propagation paths exist, depicted as propagation paths 610 and 612. Each propagation path has a plurality of consecutive OFDM symbols, shown for example as symbols 620 and 622 for propagation path 610 and symbols 624 and 626 for propagation path 612. The data contents of symbols 620 and 624 are the same, as are the data contents of symbols 622 and 626. Symbol 624 is essentially a time-delayed version of symbol 620, resulting from a reflection in the wireless propagation environment. Each symbol such as symbol 620 includes a cyclic prefix 630 and a body of the symbol 632. Similarly, symbol 622 has a cyclic prefix 634 and a body 636; symbol 624 has a cyclic prefix 638 and a body 640; and symbol 626 has a cyclic prefix 642 and a body 644.

A Fast Fourier Transform window 650, which is equal in length to the overall OFDM symbol length minus the cyclic prefix length, is positioned such that copies of the following OFDM symbol do not interfere with a current OFDM symbol. In other words, the Fast Fourier Transform window 650 does not overlap any of the received copies of the following OFDM symbols. This avoidance of intersymbol interference through the appropriate positioning of the Fast Fourier Transform window 650 is a feature of OFDM as discussed above.

Figure 7:
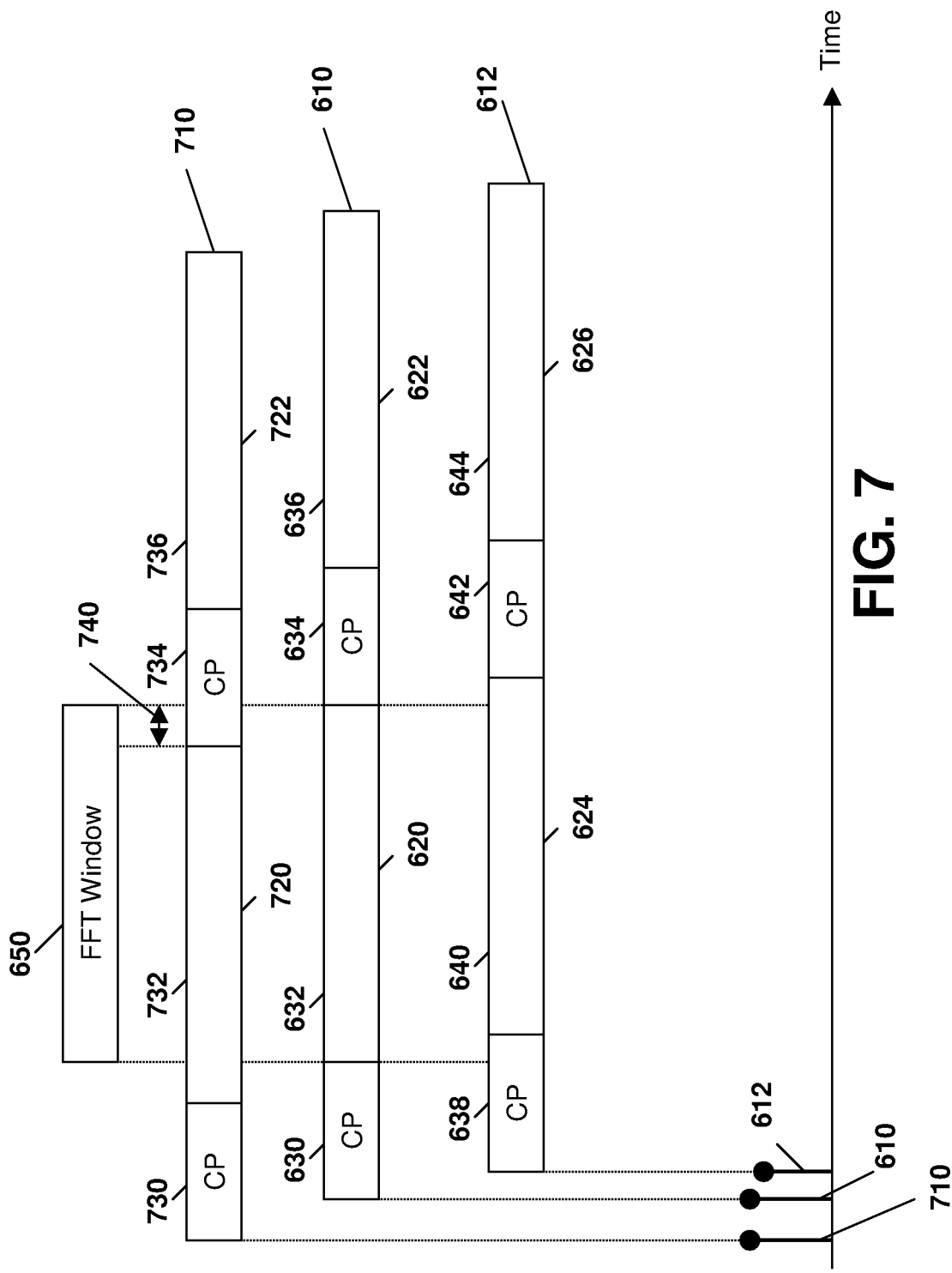
FIG. 7 is a diagram showing positioning of a Fast Fourier Transform window when a new propagation path appears.

Reference is now made to FIG. 7. In FIG. 7, propagation paths 610 and 612 exist. However, a new propagation path 710 has appeared. As indicated, the Fast Fourier Transform window 650 is positioned such that intersymbol interference between propagation path 610 and propagation path 612 is avoided.

Propagation path 710 has various OFDM symbols that include a body and cyclic prefix. In the example of FIG. 7, two symbols 720 and 722 are shown. Each has a cyclic prefix, labeled 730 and 734, and a body, labeled 732 and 736 respectively. Symbol 720 represents an earlier (in time) version of symbols 620 and 624, all of which have the same data contents. For example, symbol 720 might result from a direct line of sight path between the transmitter and receiver, whereas symbols 620 and 624 might result from reflected versions of the original signal. These reflected copies cover a greater propagation distance than does the line of sight signal, and hence the reflected symbols arrive at the receiver with a relative time delay.

The appearance of the new propagation path 710 causes intersymbol interference since the new propagation path 710 has a portion of the second OFDM symbol's cyclic prefix 734, as shown by arrow 740, overlapping the FFT window position which is aligned with the first symbol 620. Since cyclic prefix 734 belongs to a subsequent symbol, intersymbol interference results. The intersymbol interference degrades receiver performance. It is thus desirable for the receiver to identify the new propagation path quickly and reposition the FFT window 640 to avoid intersymbol interference.

As indicated above, the tracking of propagation paths observed by the receiver involves a tradeoff between performance and computational expense, with the latter directly affecting power consumption in a battery-powered mobile terminal. A propagation environment with a large number of reflectors such as a dense urban environment can cause rapid dynamic changes in one or more of the number, relative magnitudes, and relative positions of propagation paths as observed by a receiver. In such a situation, it is desirable to track changes quickly.

Conversely, in an environment with fewer reflectors such as in a suburban environment, the observed propagation paths would likely change less frequently and thus could be monitored less frequently. This results in less computation being required at a receiver and thus a power savings may be realized at the mobile terminal.

In addition, different path tracking algorithms may perform better in different propagation environments, and it may be beneficial to select a specific path tracking algorithm that has been customized for the current wireless propagation environment in order to obtain overall better performance in terms of both a higher probability of successfully decoding a downlink transmission and improved user satisfaction for use of the device.

The present disclosure provides for the customization of the operation of a wireless receiver component to account for the environment that the mobile device is in. For example, a specific algorithm may be selected, control parameters sets utilized, or both, by a receiver in a given environment.

In a further aspect of the present disclosure, methods by which the mobile terminal could obtain knowledge about the current wireless propagation environment are provided.

Figure 8:
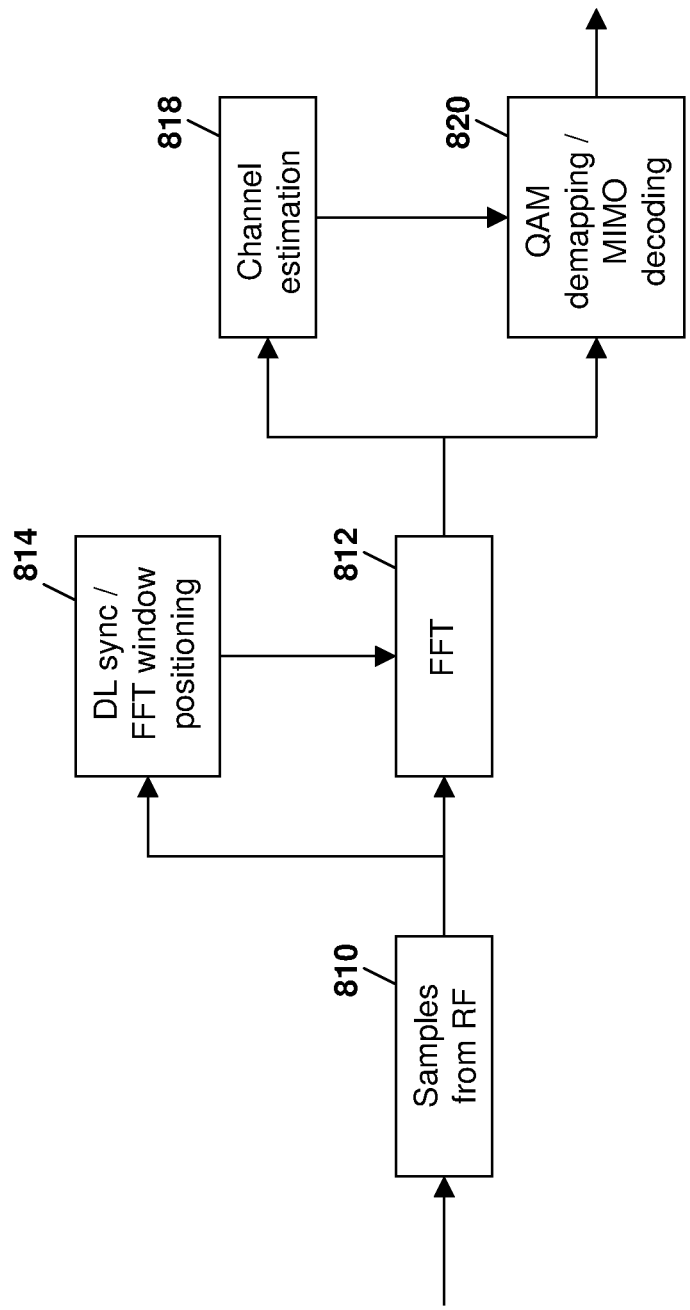
FIG. 8 is a block diagram showing a simplified exemplary orthogonal frequency divisional multiplexing receiver.

The present disclosure may be utilized with a variety of receivers. For example, referring to FIG. 8, FIG. 8 shows the relevant receiver components for an OFDM receiver that may be affected by the methods and systems of the present disclosure. As will be appreciated by those in the art, a number of receiver components that are not relevant to the present disclosure have been omitted for simplicity.

As provided for above, the downlink synchronization and Fast Fourier Transform window positioning component requires knowledge of the position and other characteristics such as relative strengths of the observed propagation paths. If a new propagation path suddenly appears or an existing path disappears, the receiver must compensate for the event by possibly shifting the Fast Fourier Transform window position.

Knowledge of the propagation environment could aid in enhancing the performance of the receiver. For example, the Fast Fourier Transform window positioning component may have elements that can be varied based on knowledge of current propagation environments such as, but not limited to, the algorithm being used; the control parameters for the algorithm such as the size of the search window used when looking for new propagation paths; the time interval between successive searches for new propagation paths; and the exact positioning of a Fast Fourier Transform window relative to observed paths.

A wireless propagation environment that generally results in less dynamic channels would allow a longer time interval between successive update searches. Furthermore, if new paths are expected to appear frequently, the FFT window may be positioned differently than if the wireless propagation environment is such that new paths are expected to appear or existing paths to disappear less frequently.

Specific examples of different propagation environments and how certain physical layer receiver algorithms can be adapted to the current propagation environment include the following.

A dense urban propagation environment as shown in FIG. 1 will contain many buildings and other potential reflectors for wireless signals. Hence, the expected characteristics of the received signal may include: no dominant line of sight path, a relatively dynamic transmission channel (e.g. paths may appear, disappear, and move (relative to the time delays of other paths) more frequently than for a more static channel), and a large number of observed paths (due to a large number of reflected signals). For such an environment, a path tracker algorithm may need to run more often in order to maintain an accurate picture of the current transmission channel. Additionally, the path tracker algorithm may be optimized for the case where the observed paths are of relatively similar powers (i.e. no dominant line of sight path is present). If no observable line of sight path is present, it may be desirable to position the FFT window to include a certain period of time before the first observed path. Thus, if a line of sight path suddenly appears, this new path (which would have a shorter time delay than the reflected paths, and would hence appear earlier in time) would have a greater probability of already being included within the current FFT window position.

Conversely, a more suburban propagation environment, such as shown in FIG. 3, will contain fewer reflectors for wireless signals. Hence, the expected characteristics of the received signal may include: a dominant line of sight path from the transmitter, a more static transmission channel (e.g. paths may appear, disappear, and move (relative to the time delays of other paths) less frequently than for a more dynamic channel), and a small number of observed paths (due to a smaller number of reflected signals). For such an environment, a path tracker algorithm could run less often and yet still maintain an accurate picture of the current transmission channel. Additionally, the path tracker algorithm may be optimized for the case of a dominant line of sight path being present and hence not all of the other propagation paths would necessarily need to be identified (e.g. if the power of a reflected propagation path is only a small fraction of the power of the dominant line of sight path, then intersymbol interference resulting from the reflected path may be negligible and it may therefore not be necessary to track that particular path). If a line of sight path is present, it may be desirable to position the FFT window such that there is only a minimal time advance of the FFT window relative to the line of sight path. Any new paths that appear should be reflected paths (which would have a longer time delay than the line of sight path, and would hence appear later in time) and would therefore have a greater probability of already being included within the current FFT window position.

The channel estimation component and QAM demapping/MIMO decoding may also benefit from knowledge of current wireless propagation environments.

Referring to FIG. 8, samples are received and processed as shown by block 810. The samples are provided to both the Fast Fourier Transform block 812, as well as the downlink synchronization/Fast Fourier Transform window positioning block 814. Knowledge from block 814 is provided to Fast Fourier Transform block 812 in order to properly position the Fast Fourier Transform window. Based on the decoding at block 812, channel estimates from channel estimation block 818 are used for QAM demapping/MIMO decoding in block 820.

As indicated above, the present disclosure may be utilized with various receiver types, and is not limited to OFDM receivers. The present disclosure could equally be utilized with any modulation scheme, including but not limited to, Code Division Multiple Access (CDMA), CDMA2000, wideband CDMA (WDCMA), Direct Sequence Spread Spectrum (DS-SS), time division multiple access (TDMA), as well as OFDM such as used in the Institute for Electrical and Electronic Engineers (IEEE) 802.16 specifications and the $3^{rd}$ Generation Partnership Project's (3GPP) E-UTRA (Evolved Universal Terrestrial Radio Access)/LTE (Long Term Evolution) specifications.

Figure 9:
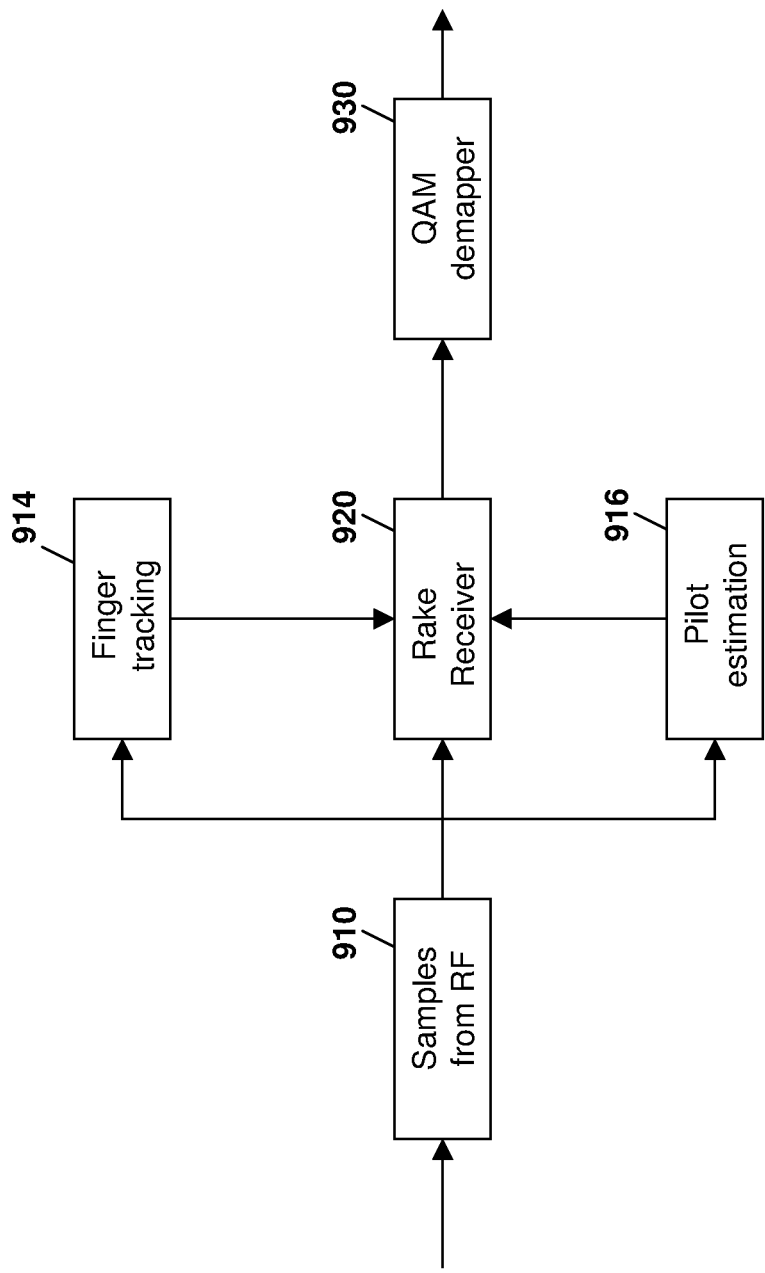
FIG. 9 is a block diagram showing a simplified exemplary Rake receiver.

For example, in a CDMA type system, the receiver components may also be affected by the methods and systems of the present disclosure. FIG. 9 shows a Rake receiver in which a number of components have been omitted for simplicity.

In a CDMA receiver such as a Rake receiver, each resolvable propagation path is typically tracked by a "finger" that collects the received signal energy from the propagation path. Any new paths that appear may have a receiver finger aligned with them to increase the total collected signal power. Similarly, any paths that disappear may be promptly identified to allow for the corresponding receiver finger to be removed.

As with the OFDM case of FIG. 8, knowledge of propagation environments may assist the receiver with predicting how quickly individual propagation paths might appear, disappear or shift positions. The information could be used to optimize finger tracking algorithms being used in each propagation environment.

As well, the pilot estimation in the QAM demapper component of a CDMA receiver may also benefit from knowledge of current propagation environments.

In FIG. 9, samples are provided from the radio frequency front end as shown in block 910. The samples are then provided to finger tracking block 914, pilot estimation block 916 and to Rake receiver block 920. Rake receiver 920 further receives input from finger tracking block 914 and pilot estimation block 916.

The output of Rake receiver block 920 is provided to QAM demapper 930 which then provides the output signal to the remainder of the receiver for further processing.

The present disclosure thus provides for enhancement of performance and decrease in the power consumption of a receiver on a mobile device. Knowledge of the current wireless propagation environment allows the receiver to match the best algorithm, control parameter set, or both, to an expected channel behavior. This could enhance average performance of a mobile terminal by increasing the probability of successfully decoding a received signal, for example. Alternatively, if mobile devices are controlled by the network to a fixed operating point such as a fixed raw block error rate, then cell capacity could potentially be increased through the use of the present methods and systems since improved receiver performance would allow a higher modulation and code set to be used on average (for a given set of channel conditions), which would result in less transmission resources being consumed on a per-terminal basis.

Reducing power consumption, and thereby extending battery life, is one consideration for a mobile device. The present methods and systems may reduce total power consumption since relevant algorithms, for example, maintaining downlink synchronization for OFDM or finger tracking for CDMA, would not have to be over-engineered so that they could always handle the worst-case scenario. Specifically, if only one algorithm or one set of algorithm configuration parameters is used for a receiver, then this algorithm must be engineered to handle worst-case scenarios.

In such an over-engineered situation, an excessive number of computations may be performed in any propagation scenario that is less severe than a worst-case scenario. The present methods allow computation expense for certain receiver algorithms to be matched to the computation requirements for different propagation environments.

In a further embodiment, additional information, such as the speed at which a mobile terminal is travelling, may also be available and could be used to assist the customization of the configuration of specific receiver algorithms.

In a further aspect of the present disclosure, the acquisition of the wireless propagation environment information is provided.

As will be appreciated by those in the art, the propagation environment may be provided to the mobile device in a variety of ways. In one embodiment, the propagation environment may be stored locally or on a network and thus be accessible to a mobile device.

Figure 10:
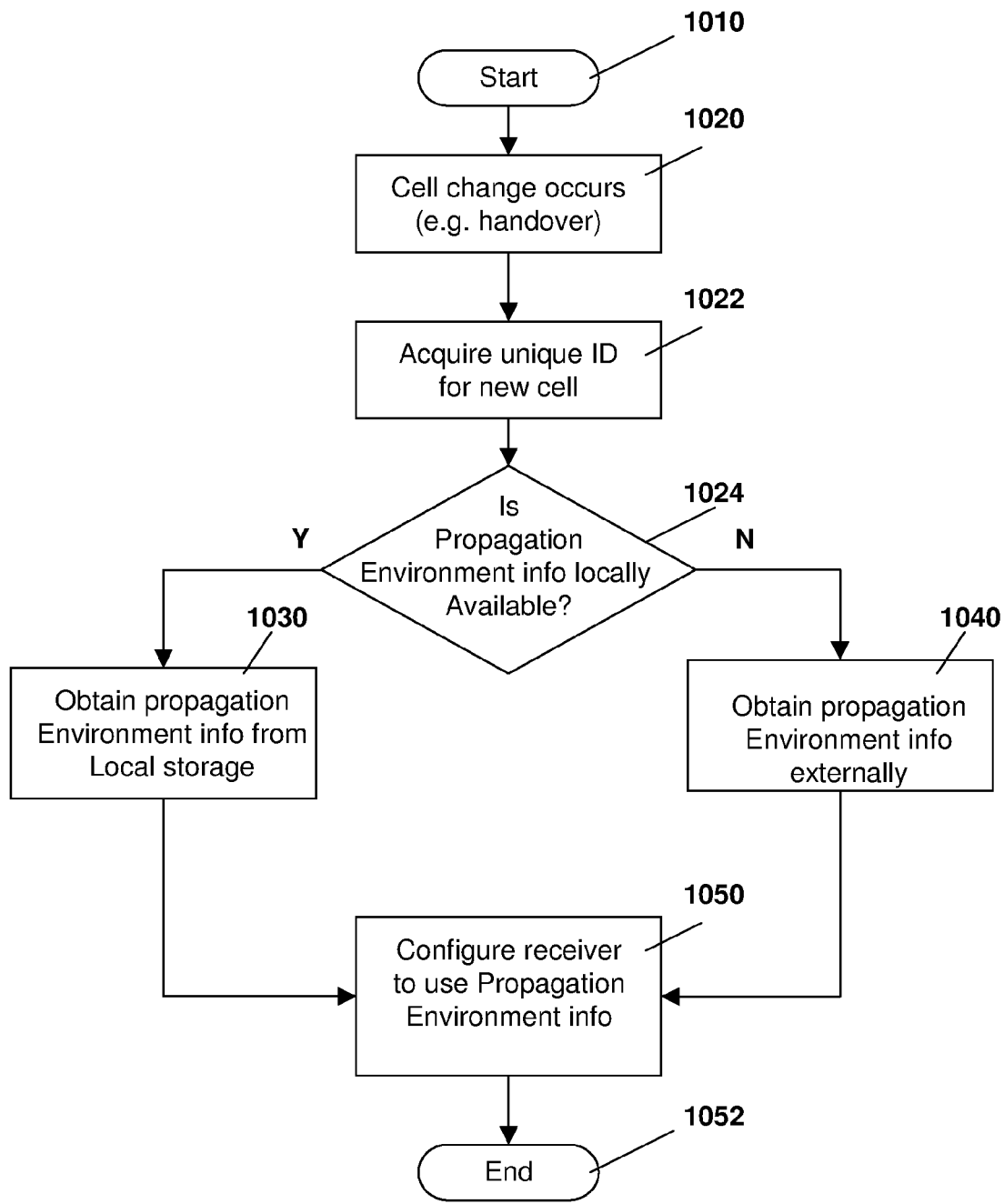
FIG. 10 is a flow diagram illustrating a method for acquiring and applying propagation environment information.

Reference is now made to FIG. 10. In FIG. 10, the process for acquiring network propagation environments is started at block 1010 and the process proceeds to block 1020 in which a cell change occurs. This may, for example, be a handover from one cell to another.

From block 1020, the process proceeds to block 1022 in which the unique identifier for the new cell is acquired at the mobile device. As will be appreciated, the unique identifier may, for example, be a network identifier and cell identifier, or other similar identifier.

At block 1024, a check is made to dFetermine whether the propagation environment information for the unique identifier for the new cell is locally available on the mobile device. If yes, the process proceeds to block 1030 in which the propagation environment information for the cell is retrieved from local storage on the mobile device.

Conversely, if the propagation environment information is not locally available on the mobile device the process proceeds from block 1024 to block 1040 in which the propagation environment information is obtained externally. From blocks 1030 or 1040, the process proceeds to block 1050 in which the receiver is configured to use the propagation environment information. As indicated above, this may be the selection of the specific algorithm for which the receiver uses to track propagation environment changes, or may involve changing channel parameters.

The process then proceeds to block 1052 and ends.

The above provides an assumption that the environmental information for a given cell is uniform for the cell. That is, the above assumes that each cell can be fairly represented by one type of propagation environment. In other embodiments, it is possible that a cell ID may be represented by a mix of two or more propagation environments.

The propagation environment information would therefore need to be obtained whenever a mobile terminal enters or is otherwise connected to a new cell. Such a situation could arise immediately following a handover from one base station to another, during a power on situation followed by an initial connection to a cell, during cell reselection while in an idle mode, among other situations.

The unique identifier identified in blocks 1022 could be, for example, a combination of the network identifier and a cell identifier or could be any other quantity that would uniquely identify a cell. Such means for uniquely identifying a cell would be known to those in the art.

The lookup in block 1030 may, for example, refer to a table in which a unique cell identifier is mapped to a propagation environment. An example of such a lookup table is provided below with regard to Table 1.

| Unique Cell ID | Propagation Environment |
| --- | --- |
| 1234 | Rural |
| 1372 | Dense urban |
| 1965 | Suburban |
| 1968 | Suburban |

Table 1 provides an example of a lookup table maintained locally within a mobile terminal which links unique cell identifiers with their corresponding propagation environments. The example lists four known cells that cover a range of different propagation environments. As would be appreciated by those skilled in the art, the exact lookup table in an actual implementation would generally contain more entries since each cell encountered by a mobile terminal could be stored here, subject to memory limitations. The use of only four unique cell identifiers is thus meant as an example and is not meant to be limiting.

Furthermore, entries that have not been used for a certain period of time could be discarded in order to limit growth and overall size of the table, to ensure that information is refreshed at regular intervals, or both. Thus, for example, if a mobile device has not looked up the propagation environment for a cell identifier for, for example, one week, this may indicate that the propagation environment for that cell identifier should be discarded and the mobile device should instead proceed to block 1040 to obtain the propagation environment for that cell identifier when that cell is next encountered.

Figure 11:
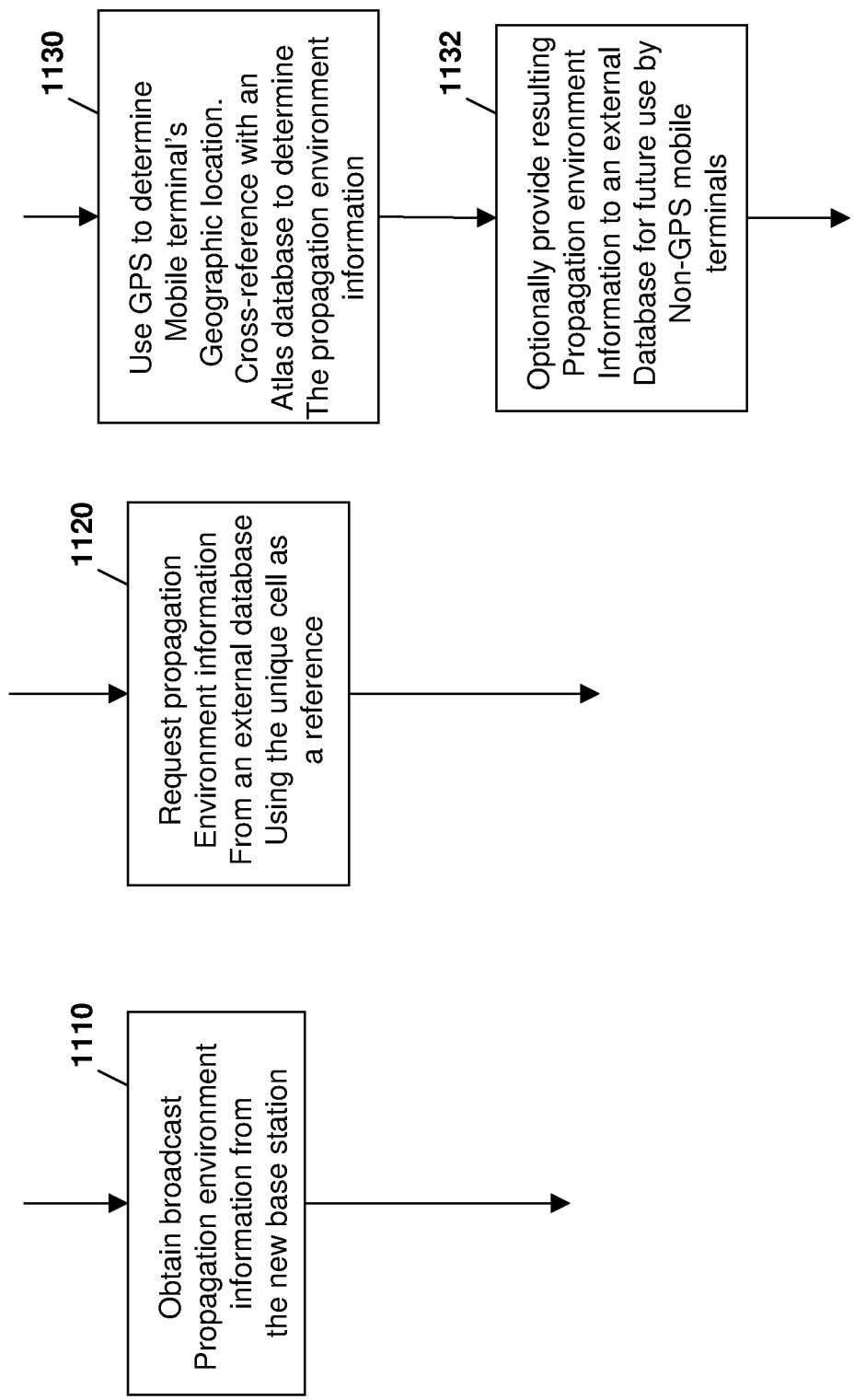
FIG. 11 is a flow diagram illustrating alternatives for externally obtaining propagation environment information.

Block 1040 could occur in a variety of ways. Reference is now made to FIG. 11, which shows three possible ways to obtain the propagation environment externally. A first embodiment involves broadcasting the propagation environment for the cell. The mobile device may obtain this information when connecting to the base station of the new cell. This is shown by block 1110.

As will be appreciated by those skilled in the art, block 1110 provides that each base station would broadcast signaling bits that would specify the type of propagation environment that represents its geographic cell. The mobile terminal would receive this broadcast information and use it based on the embodiments described above.

The signaling bits may be limited to a specific number of bits to describe overall environments. Thus, referring to Table 2 below, two bits may be used to signal for separate environments as indicated in the table. Table 2 is only however, meant only to be exemplary and more types of environments could be used. Thus, three signaling bits could be used to identify one of eight propagation environments.

Signaling bits could be incorporated with general parameter information that is already broadcast by a base station. For example, the information may be system information blocks that are broadcast by the long term evolution (LTE), evolved-universal terrestrial radio access (E-UTRA) node B (eNB).

| Signaled Bits | Propagation Environment |
| --- | --- |
| 00 | Dense urban |
| 01 | Urban |
| 10 | Suburban |
| 11 | Rural |

In Table 2 above, four examples are provided for the propagation environments. These include dense urban, urban, suburban and rural. The present disclosure is, however, not meant to be limited to these particular propagation environments, since other propagation environments might also be used. For example, in-building, rural (hilly), rural (mountainous), among others, may be additional environments. In addition, the wireless propagation environment of a cell could be represented as a mix of two different propagation environments. For example, a cell position on an edge of a downtown area might be represented as a mix of dense urban and urban propagation environments.

Such signaled bits could be, for example, used by the Radio Resource Control (RRC) at the mobile terminal to configure certain physical layer algorithms.

An alternative embodiment to the broadcast process of block 1110 may be a request for propagation environment information from an external database using a unique cell identifier as a reference. This is shown as block 1120.

The external database could be a form of a giant lookup table, with similar nature to a local lookup table that the mobile terminal could maintain. In other words, Table 1 could be expanded and stored at a network element to provide for lookup. As will be appreciated, the use of block 1120 would require a certain amount of signaling between the mobile device and each new cell encountered by the mobile device. However, as would also be appreciated, the mobile device would quickly be able to build up a local table of propagation environments associated with cells commonly encountered by that mobile device, significantly reducing the amount of future signaling needed to be performed.

In one embodiment, the external lookup table could be stored at a central network repository. In other embodiments, the lookup table could be distributed among network elements such as various regional servers. The regional servers may duplicate information in some embodiments. Thus the communication in block 1120 may occur with the nearest server or the server that the mobile device normally links with.

Communication with a server could occur as a single communication (such as one packet) in each direction. The messages may be included in other data and control plane traffic to further reduce the amount of signaling, bandwidth requirements and power requirements.

The signaling from the external database could use a limited number of bits, such as those indicated above with reference to Table 2.

In a further embodiment, the process of block 1040 could start at block 1130 in which a global positioning system (GPS) is used to determine the mobile terminal's geographical location. This GPS location could be cross-referenced with an atlas database to determine propagation environment information.

The process would then proceed to block 1132 in which the resulting propagation environment information could optionally be provided to an external database for future use by non-GPS mobile terminals. In this embodiment, the mobile terminal would be able to determine its position and the atlas database, which in one embodiment may be external, could then be queried to determine whether the current location is within a city or in the country and thus be a dense urban environment or a rural propagation environment. The mobile terminal would then be able to store a copy of the unique cell ID with a corresponding propagation environment for future reference so GPS positions would not need to be calculated on an ongoing basis. Additionally, as part of the querying process, the mobile terminal could provide the unique cell identifier to the external database in order to allow the database to build up the lookup table of unique cell identifiers and associated propagation environments.

In the event that the wireless propagation environment is locally available, information could be applied immediately. Conversely, if propagation environment information is obtained externally, it may be applied as soon as the information becomes available. That is, the physical layer could use a default set of appropriate physical layer receiver algorithms, configuration/control parameters, or both, whenever a new cell is encountered. As soon as the propagation environment information becomes available, the physical layer could then be dynamically reconfigured in order to make use of the information for optimal performance.

In a further embodiment, a mobile device may wish to validate locally stored propagation information or obtain propagation information (to be stored locally) for the current cell and/or other cells (e.g. neighboring cells). For example, the mobile device may be required to revalidate any locally stored propagation information following a certain period of time, in order to ensure that that information is still correct. In addition, a mobile device may wish to obtain propagation information for a neighboring cell that it currently does not possess. This would allow the mobile device to immediately adapt its physical layer algorithm configurations to match the propagation environment of that neighboring cell in the event of a handover, rather than having to wait and acquire the propagation information following the handover. In one embodiment, each cell may include propagation environment information for each of the neighboring cells within the broadcast neighbor cell list. In an alternative embodiment, a mobile device may use the cell identifiers obtained from the broadcast neighbor cell list to query an external database in order to obtain propagation environment information for the neighboring cells.

Figure 12:
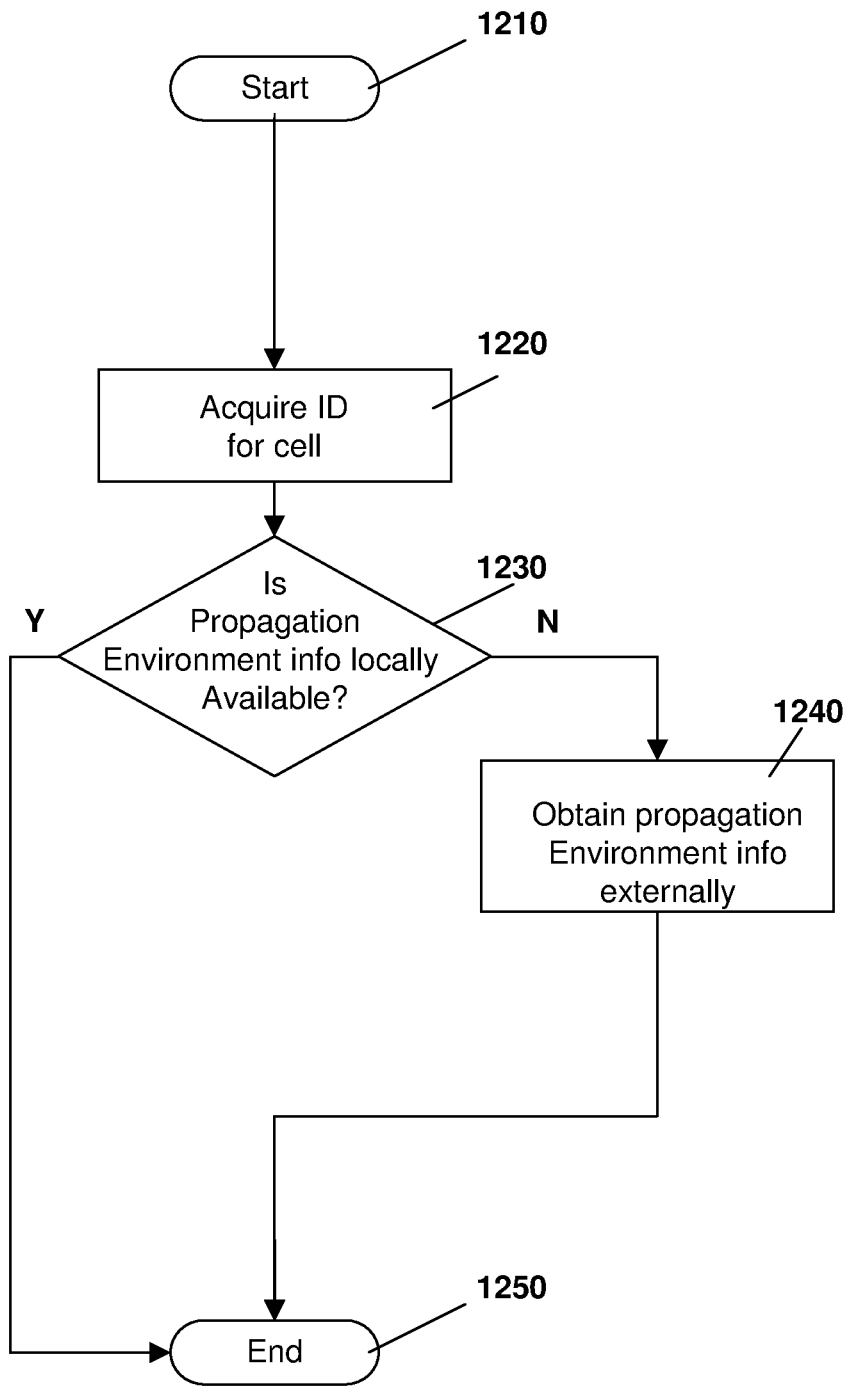
FIG. 12 is a flow diagram illustrating an alternative embodiment for obtaining propagation environment information.

Referring to FIG. 12, the figure shows a flow diagram for the alternative embodiment. The process of FIG. 12 starts at block 1210 and proceeds to block 1220 in which an identifier is acquired for a cell. As indicated above, this may be an identifier for a neighboring cell to which the mobile terminal is currently connected, or it may be the identifier to which the mobile terminal is connected if information stored on the device needs to be refreshed.

From block 1220, the process proceeds to block 1230 in which a check is made to determine whether the propagation environment information for the cell identifier is locally available. If yes, the process proceeds to block 1250 and ends. Otherwise the process proceeds to block 1240.

In block 1240, propagation environment information is obtained from an external source. The process of block 1240 could, for example, use the process of block 1120 from FIG. 11 to obtain the propagation environment information for a cell identifier from a global or regional database.

Alternatively the process of FIG. 12 could utilize the process of block 1110 from FIG. 11 if the broadcast information included propagation environment information about neighboring cells or if the desired broadcast information was obtained directly from the neighboring cells' signals by the mobile terminal. Block 1110 could also be used if the propagation environment information being obtained corresponds with the network cell the mobile terminal is connected to, for example during a refresh of propagation environment information in a local table.

Further, the process of block 1130 could be used if the GPS coordinates are used for the current cell the mobile terminal is connected to, or if the atlas lookup could associate neighboring cells with propagation environment information.

From block 1240 the process proceeds to block 1250 and ends.

As will be appreciated, the above can be implemented on any mobile terminal. One exemplary mobile terminal is described below with reference to FIG. 13. This is not meant to be limiting, but is provided for illustrative purposes.

Figure 13:
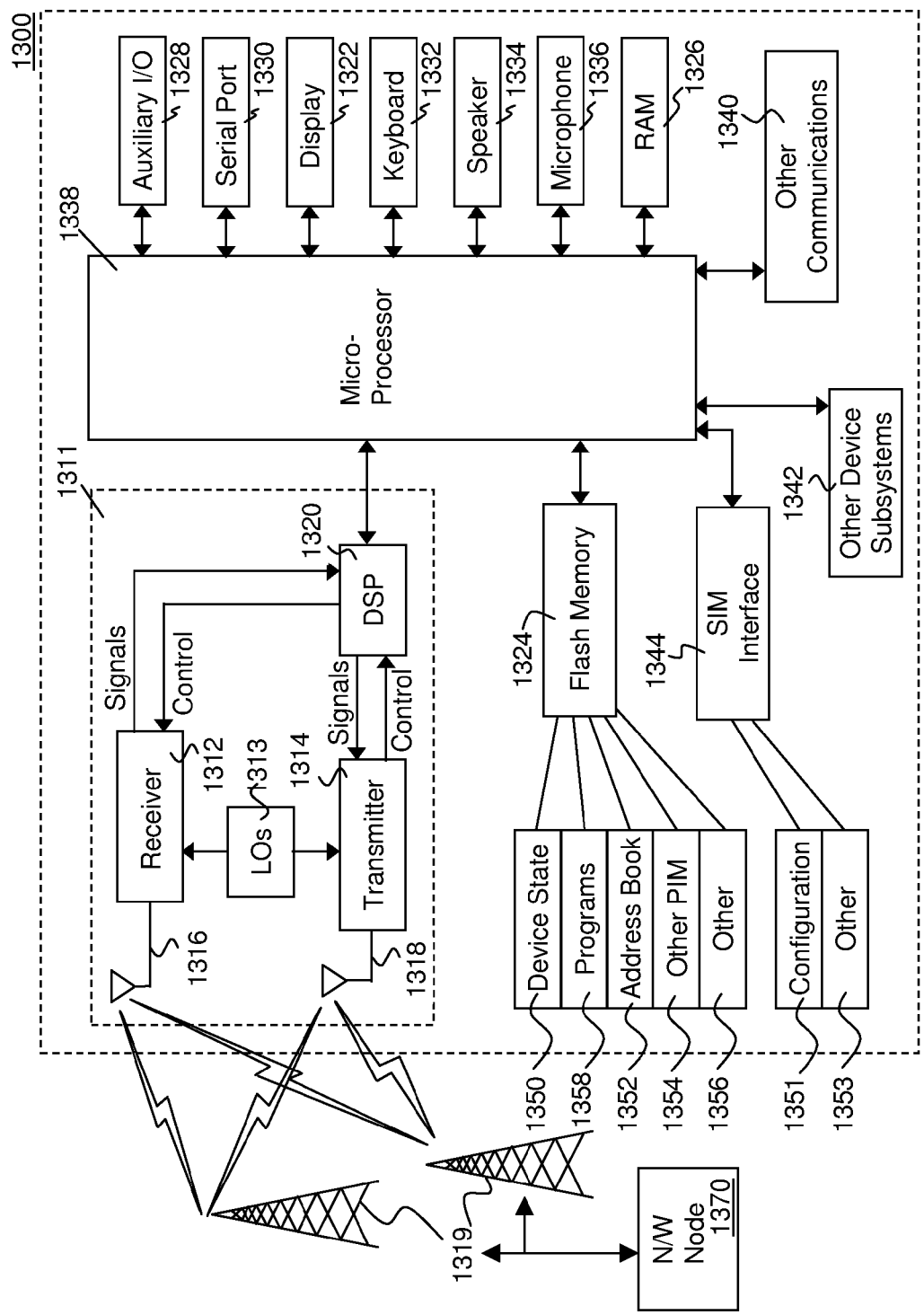
FIG. 13 is a block diagram of an exemplary mobile device capable of being used with the methods herein.

FIG. 13 is a block diagram illustrating a mobile terminal capable of being used with preferred embodiments of the apparatus and method of the present application. Mobile terminal 1300 is typically a two-way wireless communication device having voice communication capabilities. Depending on the exact functionality provided, the mobile device may be referred to as a wireless device, data messaging device, a two-way pager, a wireless e-mail device, a cellular telephone with data messaging capabilities, a wireless Internet appliance, a user equipment or a data communication device, as examples.

Where mobile terminal 1300 is enabled for two-way communication, it may incorporate a communication subsystem 1311, including both a receiver 1312 and a transmitter 1314, as well as associated components such as one or more, generally embedded or internal, antenna elements 1316 and 1318, local oscillators (LOs) 1313, and a processing module such as a digital signal processor (DSP) 1320. As will be apparent to those skilled in the field of communications, the particular design of the communication subsystem 1311 will be dependent upon the communication network in which the device is intended to operate.

Network access requirements will also vary depending upon the type of network 1319. A GSM or LTE mobile terminal may require a subscriber identity module (SIM) card in order to operate on the GSM, LTE or LTE-A network. The SIM interface 1344 is normally similar to a card-slot into which a SIM card can be inserted and ejected like a diskette or PCMCIA card. The SIM card may hold key configuration 1351, and other information 1353 such as identification, and subscriber related information. For CDMA devices, a removable user identity module (R-UIM) may instead be used.

When required network registration or activation procedures have been completed, mobile terminal 1300 may send and receive communication signals over the network 1319. As illustrated in FIG. 13, network 1319 can consist of multiple antennas communicating with the mobile terminal. These antennas are in turn connected to a network element 1370.

Signals received by antenna 1316 through communication network 1319 are input to receiver 1312, which may perform such common receiver functions as signal amplification, frequency down conversion, filtering, channel selection and the like, and in the example system shown in FIG. 13, analog to digital (A/D) conversion. A/D conversion of a received signal allows more complex communication functions such as demodulation and decoding to be performed in the DSP 1320. In a similar manner, signals to be transmitted are processed, including modulation and encoding for example, by DSP 1320 and input to transmitter 1314 for digital to analog conversion, frequency up-conversion, filtering, amplification and transmission over the communication network 1319 via antenna 1318. DSP 1320 not only processes communication signals, but also provides for receiver and transmitter control. For example, the gains applied to communication signals in receiver 1312 and transmitter 1314 may be adaptively controlled through automatic gain control algorithms implemented in DSP 1320.

Mobile terminal 1300 generally includes a microprocessor 1338 which controls the overall operation of the device. Communication functions, including data and voice communications, are performed through communication subsystem 1311. Microprocessor 1338 also interacts with further device subsystems such as the display 1322, flash memory 1324, random access memory (RAM) 1326, auxiliary input/output (I/O) subsystems 1328, serial port 1330, one or more keyboards or keypads 1332, speaker 1334, microphone 1336, other communication subsystem 1340 such as a short-range communications subsystem and any other device subsystems generally designated as 1342. Serial port 1330 could include a USB port or other port known to those in the art.

Some of the subsystems shown in FIG. 13 perform communication-related functions, whereas other subsystems may provide "resident" or on-device functions. Notably, some subsystems, such as keyboard 1332 and display 1322, for example, may be used for both communication-related functions, such as entering a text message for transmission over a communication network, and device-resident functions such as a calculator or task list.

Operating system software used by the microprocessor 1338 is generally stored in a persistent store such as flash memory 1324, which may instead be a read-only memory (ROM) or similar storage element (not shown). Those skilled in the art will appreciate that the operating system, specific device applications, or parts thereof, may be temporarily loaded into a volatile memory such as RAM 1326. Received communication signals may also be stored in RAM 1326.

As shown, flash memory 1324 can be segregated into different areas for both computer programs 1358 and program data storage 1350, 1352, 1354 and 1356. These different storage types indicate that each program can allocate a portion of flash memory 1324 for their own data storage requirements. Further, a table containing propagation environments may be stored in flash memory 1324. Microprocessor 1338, in addition to its operating system functions, preferably enables execution of software applications on the mobile terminal. A predetermined set of applications that control basic operations, including at least data and voice communication applications for example, may be installed on mobile terminal 1300 during manufacturing. Other applications could be installed subsequently or dynamically.

One software application may be a personal information manager (PIM) application having the ability to organize and manage data items relating to the user of the mobile terminal such as, but not limited to, e-mail, calendar events, voice mails, appointments, and task items. Naturally, one or more memory stores may be available on the mobile terminal to facilitate storage of PIM data items. Such PIM application would generally have the ability to send and receive data items, via the wireless network 1319. In one embodiment, the PIM data items are seamlessly integrated, synchronized and updated, via the wireless network 1319, with the mobile terminal user's corresponding data items stored or associated with a host computer system. Further applications may also be loaded onto the mobile terminal 1300 through the network 1319, an auxiliary I/O subsystem 1328, serial port 1330, short-range communications subsystem 1340 or any other suitable subsystem 1342, and installed by a user in the RAM 1326 or a non-volatile store (not shown) for execution by the microprocessor 1338. Such flexibility in application installation increases the functionality of the device and may provide enhanced on-device functions, communication-related functions, or both. For example, secure communication applications may enable electronic commerce functions and other such financial transactions to be performed using the mobile terminal 1300.

In a data communication mode, a received signal such as a text message or web page download will be processed by the communication subsystem 1311 and input to the microprocessor 1338, which may further process the received signal for element attributes for output to the display 1322, or alternatively to an auxiliary I/O device 1328.

A user of mobile terminal 1300 may also compose data items such as email messages for example, using the keyboard 1332, which is in one embodiment is a complete alphanumeric keyboard or telephone-type keypad, in conjunction with the display 1322 and possibly an auxiliary I/O device 1328. Such composed items may then be transmitted over a communication network through the communication subsystem 1311.

For voice communications, overall operation of mobile terminal 1300 is similar, except that received signals can be output to a speaker 1334 and signals for transmission may be generated by a microphone 1336. Alternative voice or audio I/O subsystems, such as a voice message recording subsystem, may also be implemented on mobile terminal 1300. Although voice or audio signal output may be accomplished primarily through the speaker 1334, display 1322 may also be used to provide an indication of the identity of a calling party, the duration of a voice call, or other voice call related information for example.

Serial port 1330 in FIG. 13 would normally be implemented in a personal digital assistant (PDA)-type mobile terminal for which synchronization with a user's desktop computer (not shown) may be desirable, but is an optional device component. Such a port 1330 would enable a user to set preferences through an external device or software application and would extend the capabilities of mobile terminal 1300 by providing for information or software downloads to mobile terminal 1300 other than through a wireless communication network. The alternate download path may for example be used to load an encryption key onto the device through a direct and thus reliable and trusted connection to thereby enable secure device communication. As will be appreciated by those skilled in the art, serial port 1330 can further be used to connect the mobile terminal to a computer to act as a modem.

Other communications subsystems 1340, such as a short-range communications subsystem, are a further component which may provide for communication between mobile terminal 1300 and different systems or devices, which need not necessarily be similar devices. For example, the subsystem 1340 may include an infrared device and associated circuits and components or a Bluetooth™ communication module to provide for communication with similarly enabled systems and devices. Subsystem 1340 may also be used for WiFi or WiMAX communications.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

I claim:

1. A method for receiver adaptation of a mobile device communicating with a network cell, comprising:
   receiving a cell identifier of the network cell at a processor on the mobile device;
   checking local storage on the mobile device for propagation environment information corresponding to the cell identifier;
   obtaining propagation environment information corresponding to the cell identifier, wherein if propagation environment information corresponding to the cell identifier is present in the local storage, then the propagation environment information is obtained from the local storage; and
   configuring at least one of an algorithm and control parameters of a receiver of the mobile device utilizing the propagation environment information.

2. The method of claim 1, wherein if propagation environment information corresponding to the cell identifier is not present in the local storage, then the propagation environment information corresponding to the cell identifier is obtained externally to the mobile device.

3. The method of claim 2, wherein the obtaining propagation environment information externally to the mobile device includes receiving propagation environment information through the network cell.

4. The method of claim 3, wherein the obtaining propagation environment information externally to the mobile device includes querying a database on a network element and receiving propagation environment information from the database.

5. The method of claim 2, wherein the obtaining propagation environment information externally to the mobile device includes receiving a broadcast signal containing the propagation environment information at the mobile device.

6. The method of claim 2, wherein the obtaining propagation environment information externally to the mobile device includes determining a position of the mobile device by utilizing a global positioning system on the mobile device, querying an atlas database using the position of the mobile device, and determining propagation environment information based on information from the atlas database.

7. The method of claim 6, further comprising providing the propagation environment information to a database on a network element.

8. The method of claim 1, wherein the algorithm is selected to respond to a likelihood of new propagation paths appearing based on the propagation environment information.

9. The method of claim 8, wherein the algorithm shifts a Fast Fourier Transform window in response to a new propagation path being detected.

10. The method of claim 1, wherein the algorithm is optimized for propagation paths having similar relative strengths.

11. The method of claim 1, wherein a frequency of execution of the algorithm is determined based on the propagation environment information.

12. The method of claim 1, wherein the control parameters include at least one of a channel estimation component; a Quadrature Amplitude Modulation demapping parameter; and a multiple input, multiple output decoding parameter.

13. The method of claim 1, wherein the propagation environment information includes a propagation environment selected from a group consisting of a dense urban environment; a suburban environment; and a rural environment.

14. A mobile device, comprising
   a communications subsystem configured for communicating with a network cell, the communications subsystem including a receiver; and
   a processor,
   wherein the mobile device is configured to:
      receive a cell identifier of the network cell at the processor of the mobile device;
      check local storage on the mobile device for propagation environment information corresponding to the cell identifier;
      obtain propagation environment information corresponding to the cell Identifier, wherein if propagation environment information corresponding to the cell identifier is present in the local storage, then the propagation environment information is obtained from the local storage; and
      configure at least one of an algorithm and control parameters of the receiver of the mobile device utilizing the propagation environment information.

15. A method for obtaining propagation environment information at a mobile device comprising:
   acquiring a cell identifier at the mobile device;
   checking local storage on the mobile device for propagation environment information corresponding to the cell identifier;
   obtaining propagation environment information corresponding to the acquired cell identifier, wherein if propagation environment information corresponding to the cell identifier is present in the local storage, then the propagation environment information is obtained from the local storage; and
   configuring at least one of an algorithm and control parameters of a receiver of the mobile device utilizing the propagation environment information.

16. The method of claim 15, wherein if propagation environment information corresponding to the cell identifier is not present in the local storage, then the propagation environment information corresponding to the cell identifier is obtained externally to the mobile device.

17. The method of claim 16, wherein the obtaining propagation environment information externally to the mobile device includes receiving a broadcast signal containing propagation environment information at the mobile device.

18. The method of claim 16, wherein the obtaining propagation environment information externally to the mobile device includes querying a database on a network element and receiving propagation environment information from the database.

19. The method of claim 16, wherein the obtaining propagation environment information externally to the mobile device includes determining a position of the mobile device by utilizing a global positioning system on the mobile device, querying an atlas database using the position of the mobile device, and determining propagation environment information based on information from the atlas database.

20. The method of claim 15, wherein the obtained propagation environment information is in a form of one or more signaling bits specifying a propagation environment.

21. The method of claim 15, wherein the propagation environment information includes a propagation environment selected from a group consisting of a dense urban environment; a suburban environment; and a rural environment.

22. A mobile device, comprising
a communications subsystem configured for communicating with a network cell, the communications subsystem including a receiver; and
a processor,
wherein the mobile device is configured to:
acquire a cell identifier at the mobile device;
check local storage on the mobile device for propagation environment information corresponding to the cell identifier; and
obtain propagation environment information corresponding to the acquired cell identifier, wherein if propagation environment information corresponding to the cell identifier is present in the local storage, then the propagation environment information is obtained from the local storage; and
configure at least one of an algorithm and control parameters of a receiver of the mobile device utilizing the propagation environment information.

* * * * *